(12) United States Patent
Swei et al.

(10) Patent No.: US 12,258,490 B2
(45) Date of Patent: Mar. 25, 2025

(54) ABRASIVES

(71) Applicant: Applied Scientific International LLC, Englewood, OH (US)

(72) Inventors: Gwo Shin Swei, Vandalia, OH (US); George Shuai, Centerville, OH (US); Isaac Shuai, Eastvale, CA (US)

(*) Notice: Subject to any disclaimer, the term of this patent is extended or adjusted under 35 U.S.C. 154(b) by 41 days.

(21) Appl. No.: 17/865,000

(22) Filed: Jul. 14, 2022

(65) Prior Publication Data
US 2024/0018370 A1    Jan. 18, 2024

(51) Int. Cl.
*C09D 7/61* (2018.01)
*C09D 7/20* (2018.01)
*C09D 163/00* (2006.01)

(52) U.S. Cl.
CPC .............. *C09D 7/61* (2018.01); *C09D 7/20* (2018.01); *C09D 163/00* (2013.01)

(58) Field of Classification Search
CPC .......... B24D 18/00; B24D 3/02; B24D 11/00; B24D 3/34
See application file for complete search history.

(56) References Cited

U.S. PATENT DOCUMENTS

| | | | |
|---|---|---|---|
| 5,219,462 A * | 6/1993 | Bruxvoort | B24D 3/28 51/293 |
| 5,378,251 A | 1/1995 | Culler et al. | |
| 5,833,724 A | 11/1998 | Wei et al. | |
| 5,840,088 A | 11/1998 | Yang et al. | |
| 5,863,306 A | 1/1999 | Wei et al. | |
| 6,451,076 B1 | 9/2002 | Nevoret et al. | |
| 8,118,896 B2 | 2/2012 | Can et al. | |

FOREIGN PATENT DOCUMENTS

GB         510328    *  7/1939  ........... B24D 11/005

* cited by examiner

*Primary Examiner* — Pegah Parvini
(74) *Attorney, Agent, or Firm* — Thomas E. Lees, LLC

(57) ABSTRACT

A process that controls sizes, shapes, and densities of the abrasive composite structures on a substrate by controlling the properties of the slurry (more than just the number and size of the particles in the slurry), controlling wet coating thickness of the slurry on the substrate, and controlling drying conditions of the slurry. Similar to how mud dries and cracks when arid and parched, the controlled drying of the slurry produces cracks as the slurry dries. These cracks form structures that are separated by grooves (or valleys), which form the abrasive surface.

3 Claims, 20 Drawing Sheets

2450μm

2450μm

ABRASIVES

BACKGROUND

Field of the Disclosure

The present disclosure relates generally to abrasives and, more particularly, to controlling sizes, shapes, and densities of abrasive composite structures on a substrate.

Description of Related Art

There are many different types of abrasives, such as, for example, slurries, coated abrasive, etc. The coarseness or fineness of the abrasives vary for different uses. For slurry-coated abrasives, the coarseness or fineness depends on the size, shape, and densities of the abrasive composite structures on the substrate. Conventional slurry-coated abrasives derive their properties from a combination of primary particles (e.g., alumina, silica, silicon carbide, diamond, ceria, etc.) and binders on the substrate.

SUMMARY

The present disclosure provides systems, methods, and articles of manufacture with varying sizes, shapes, and densities of abrasive composite structures that are formed on an abrasive substrate.

In one embodiment, the sizes, shapes, and densities of the abrasive composite structures on a substrate are varied by controlling properties of the slurry (more than just the number and size of the primary particles in the slurry), controlling wet coating thickness of the slurry on the substrate, and controlling drying conditions of the slurry. Similar to how mud dries and cracks when arid and parched, the controlled drying of the slurry produces cracks as the slurry dries. These cracks form abrasive composite structures that are separated by grooves (or valleys), thereby forming the abrasive surface.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
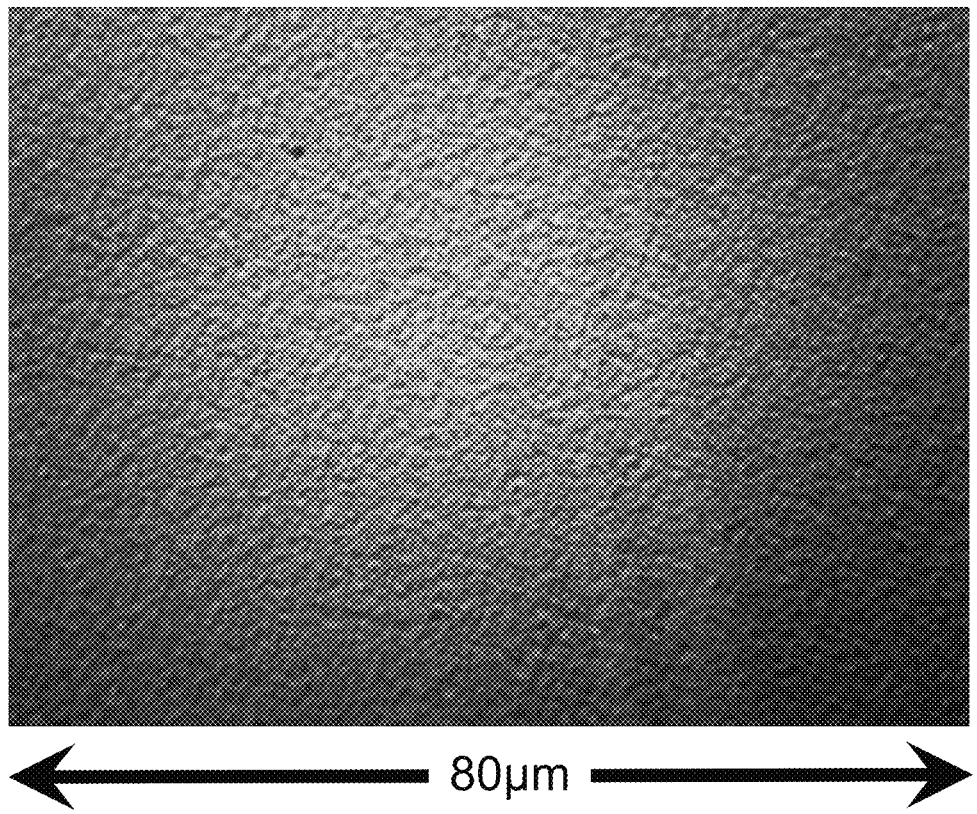
FIG. 1 is a diagram showing one embodiment of typical abrasive composite structure.

Coarseness or fineness of slurry-coated abrasives vary depending on their respective uses. For slurry-coated abrasives, the coarseness or fineness depends on the size, shape, and densities of the abrasive composite structures on the substrate. Conventional slurry-coated manufacturing processes control the types and sizes of the primary particles (e.g., alumina, silica, silicon carbide, diamond, ceria, etc.) in the slurries, which in turn determine whether the slurry-coated abrasive is coarse-grained or fine-grained.

Other known processes for manufacturing coarse or fine abrasives use structured patterns that are created by some sort of mold or other known embossing technique. These types of embossing techniques produce homogeneous abrasive composite structures, which have very little variability (e.g., the standard deviation of the diameters of the abrasive composite structures is controlled to be within five percent (5%) of the average abrasive composite structure size). As those having skill in the art will appreciate, for a non-circular structure, its diameter is expressly defined herein as the largest or longest measurable end-to-end distance of the non-circular structure.

Unlike conventional processes for manufacturing slurry-coated abrasives, the disclosed embodiments vary the sizes, shapes, and densities of the abrasive composite structures by controlling properties of the slurry (more than just the number and size of the primary particles in the slurry), controlling wet coating thickness of the slurry on a substrate, and controlling drying conditions of the slurry. Similar to how mud dries and cracks when arid and parched, the controlled drying of the slurry produces cracks as the slurry dries. These cracks form structures that are separated by grooves (or valleys), which form the abrasive surface. Because the abrasive surfaces are formed without the use of molds or other pre-defined structural patterns, the abrasive composite structures in the disclosed embodiments exhibit a significantly larger variability (e.g., the standard deviation of the diameters of the abrasive composite structures are greater than ten percent (>10%) of the average abrasive composite structure size (sometimes >20%, >30%, >50%, or even >80%)). Both surprisingly and unexpectedly, even with less-homogeneous abrasive composite structure sizes, the disclosed embodiments provide a better polish than conventional slurry-coated abrasives. Additionally (and also unexpectedly surprising), the disclosed abrasives have higher stock removal, are more durable, and last longer than conventionally manufactured slurry-coated abrasives.

Having provided a broad technical solution to a technical problem, reference is now made in detail to the description of the embodiments as illustrated in the drawings, namely, FIGS. 1 through 9C are diagrams showing different abrasive surfaces that form as a result of varying slurry composition, wet coating thickness, and drying conditions, while FIGS. 10 through 14 are flowcharts showing various process steps that are used to produce the different abrasive surfaces. Although several embodiments are described in connection with these drawings, there is no intent to limit the disclosure to the embodiment or embodiments disclosed herein. On the contrary, the intent is to cover all alternatives, modifications, and equivalents.

Figure 2:
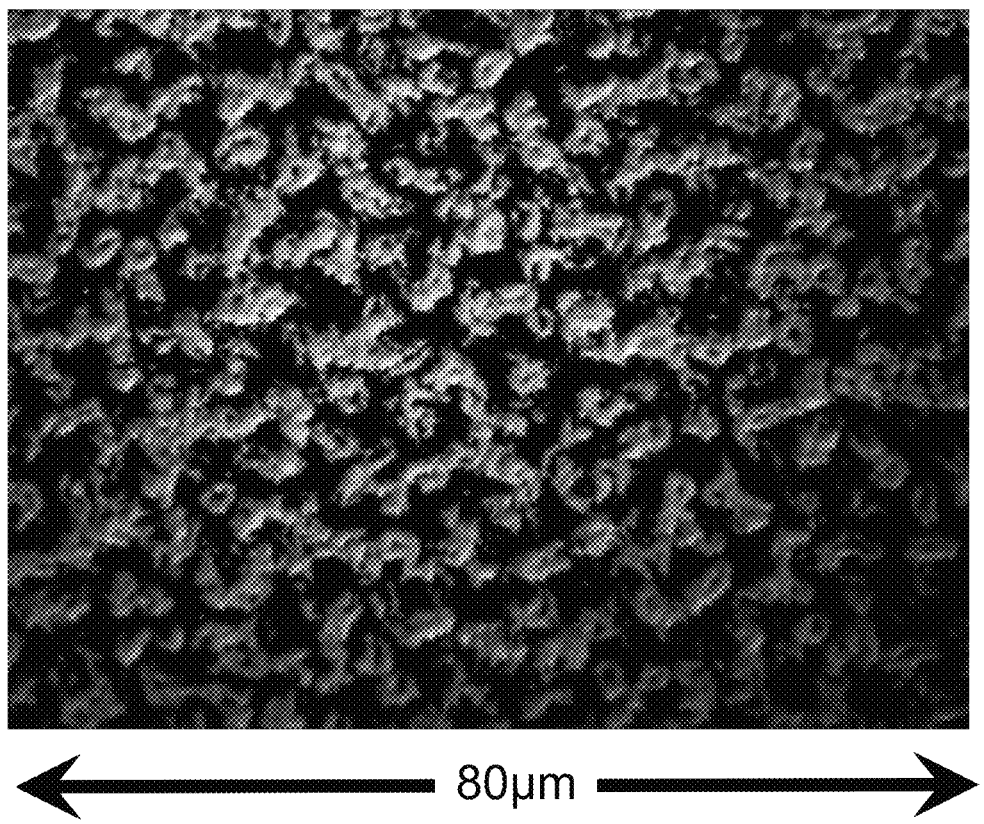
FIG. 2 is a diagram showing one embodiment of irregular-shaped abrasive composite structures.
Figure 3:
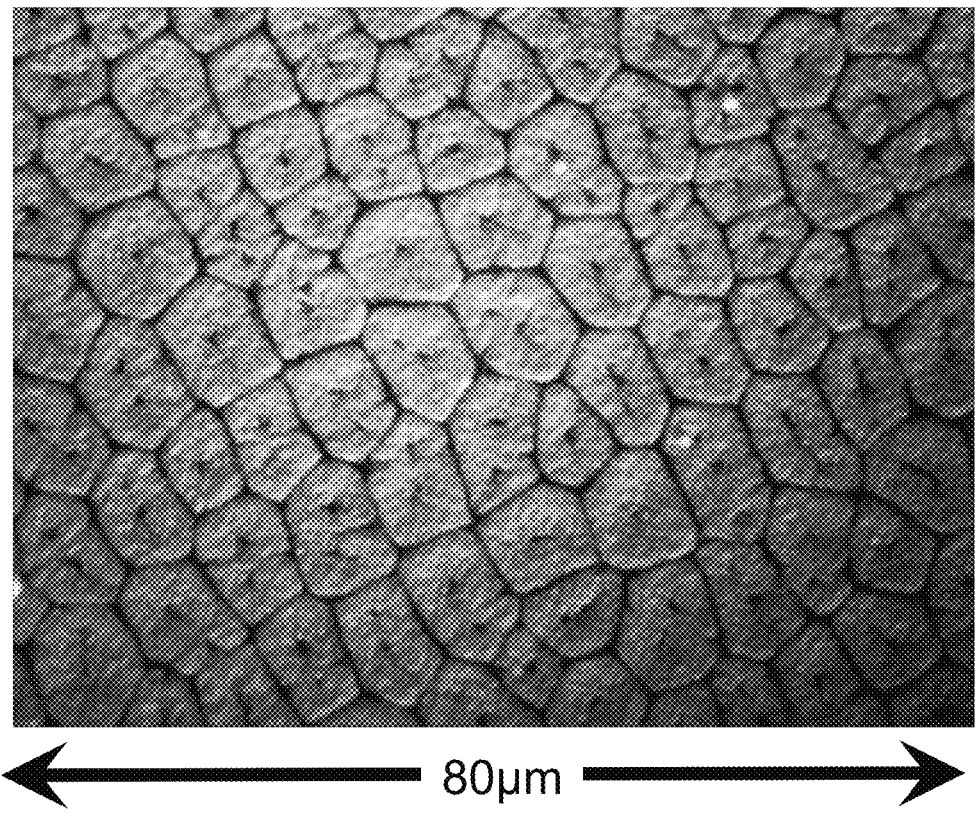
FIG. 3 is a diagram showing one embodiment of regular-shaped abrasive composite structures with internal cavities.
Figure 4:
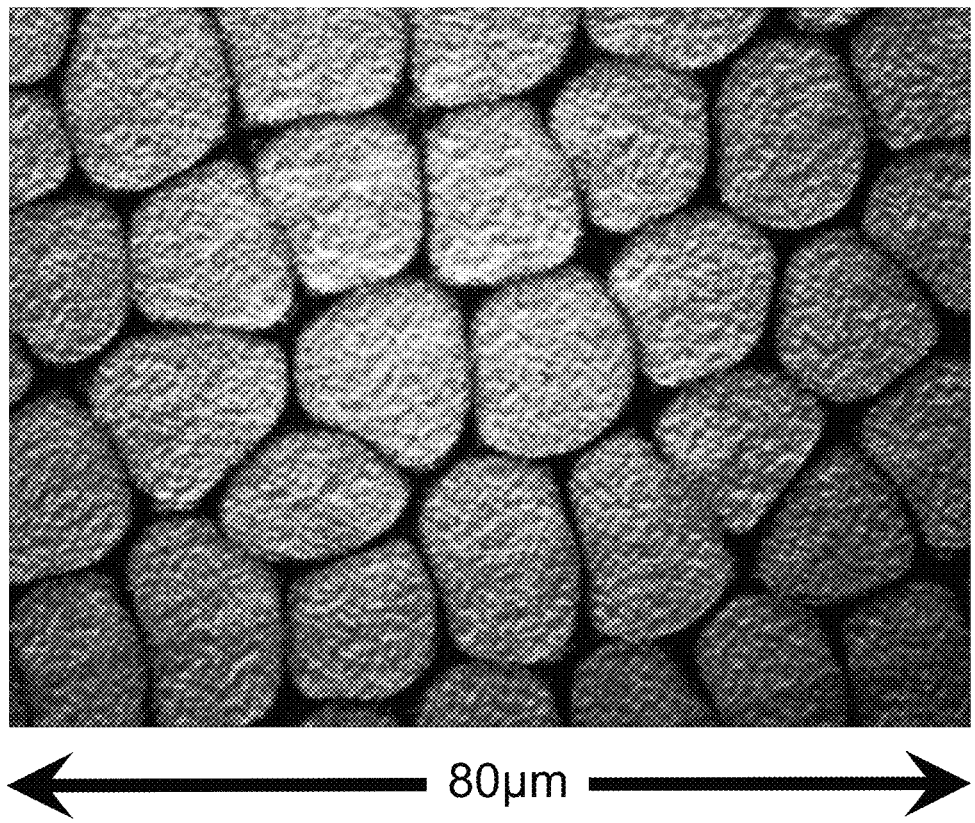
FIG. 4 is a diagram showing one embodiment of regular-shaped abrasive composite structures without internal cavities.

To properly understand the process, it is helpful to first review several different types of slurry-coated abrasive composite structures, such as those shown in FIGS. 1, 2, 3, and 4. For comparative purposes, a scale (on the order of micrometers ($\mu$m)) is also shown in FIGS. 1 through 4. By way of example, FIG. 1 shows abrasive composite structures that are fine and homogeneous with very small spacing between the abrasive composite structures (comparable to traditional slurry-coated abrasives), while FIG. 2 shows abrasive composite structures that are irregular in shape with larger spacing between the abrasive composite structures. Both FIGS. 3 and 4 show abrasive composite structures that are fairly regular in shape. However, the structures in FIG. 3 have cavities or dimples, while the structures in FIG. 4 are substantially devoid of cavities or dimples. The different shapes, sizes, spacings (and densities), and materials associated with the abrasive composite structures control the abrasive properties. Thus, an ability to control these factors provides an avenue by which coarseness and fineness of the abrasives can be controlled.

This disclosure teaches how the sizes of the abrasive composite structures are controlled from approximately one hundred nanometers (~100 nm) up to approximately one millimeter (~1 mm). Additionally, the shapes of the abrasive composite structures are controllable, with shapes including circles, polygons, different types of U-shaped crescents, and much more. Both the sizes and shapes of the abrasive composite structures are controllable by systematically altering the composition of the slurry, the wet coating thickness, and the drying conditions of the slurry. To be clear, although it is known that cracks or crevices can result during the drying of slurry, what is not well known or well understood by those having skill in the art is how precisely each of the different properties of the slurry affect the size, shape, and spacing as the slurry cracks. This is because even a small alteration in one slurry property can influence how other slurry properties affect the drying and cracking behavior of the slurry. In other words, what is neither known nor predictable is how the coarseness or fineness of the abrasive composite structures can be controlled by judicious selection of slurry properties, wet coating thickness, and drying conditions.

In addition to the manufacturing process being unpredictable, the resulting abrasives also exhibit surprisingly unexpected properties. For example, although the disclosed abrasives have greater variability in abrasive composite structure size than conventional slurry-coated abrasives (which exhibit very little variability), the disclosed abrasives provide a better polish than conventional slurry-coated abrasives. Additionally, the disclosed abrasives are more durable and last longer than conventionally manufactured slurry-coated abrasives, with some lasting nearly then (10) times longer than corresponding conventional slurry-coated abrasives. Example comparisons are shown and described in detail with reference to FIGS. 15 through 18.

Figure 5A:
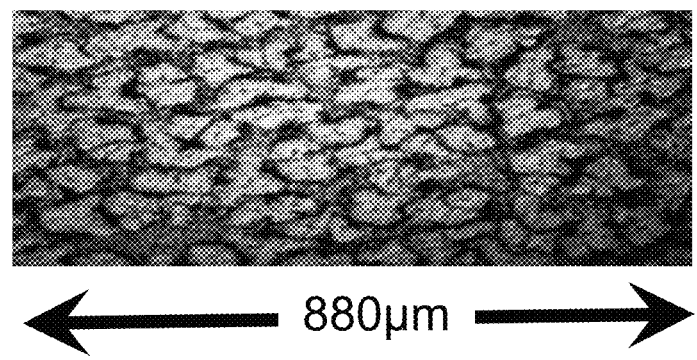
FIG. 5A is a diagram showing one embodiment of abrasive composite structures formed with a higher primary particle content.
Figure 5B:
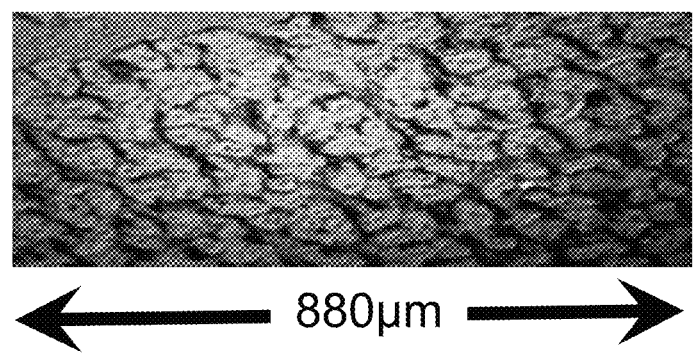
FIG. 5B is a diagram showing one embodiment of abrasive composite structures formed with a lower primary particle content.

With these complexities in mind, attention is turned to FIGS. 5A and 5B, which show different abrasive composite structures that are formed by changing primary particle content (again with a scale shown for comparative purposes). As is known, the primary particle is an abrasive or solid particle from which the abrasive composite structures are formed. Examples of primary particles include, for example, diamond, aluminum oxide, silicon carbide, etc. However, what is not known is how precisely the primary particle content affects the coarseness or fineness of the resulting coated abrasive. Specifically, FIG. 5A shows abrasive composite structures that are formed by using a higher primary particle content (e.g., 0.92% wet volume), while FIG. 5B shows abrasive composite structures that are formed by using a lower primary particle content (e.g., 2.14% wet volume). Preferably, the primary particle content is less than approximately fifteen percent (~15%) by volume. Other parameters for FIGS. 5A and 5B are shown in TABLE 1.

TABLE 1

PRIMARY PARTICLE

|  | FIG. 5A | FIG. 5B |
|---|---|---|
| Primary Particle Content | 0.92% wet volume | 2.14% wet volume |
| Solids Content | 5.99% volume (after drying) | 7.15% volume (after drying) |
| Ratio of Isopropyl Alcohol:Water | 1.718:1 | 1.718:1 |
| Viscosity | 60 centipoise (cP) | 50 cP |
| Wet Coating Thickness | Bar 30, 45 cc/m$^2$ | Bar 30, 45 cc/m$^2$ |
| Drying Temperature | 121° C. | 121° C. |
| Drying Air Flow | 0.7 m/s | 0.7 m/s |

As shown in FIGS. 5A and 5B, an increase in primary particle content (and, thus, a decrease in wet volume) produces better-defined, tighter (or denser) abrasive composite structures, which have less spacing between the abrasive composite structures. Also noteworthy is that the sizes of the abrasive composite structures have relatively larger variabilities as compared to conventional abrasive composite structures, such as, for example, embossed or molded structures that have very small variabilities. The larger variability is due to the natural drying and cracking process, which (unlike embossing or molding processes) cannot be controlled with mathematical precision.

Figure 6A:
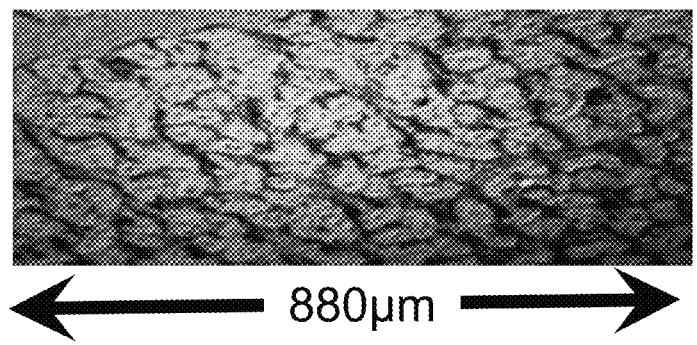
FIG. 6A is a diagram showing one embodiment of abrasive composite structures formed with a lower binder content.
Figure 6B:
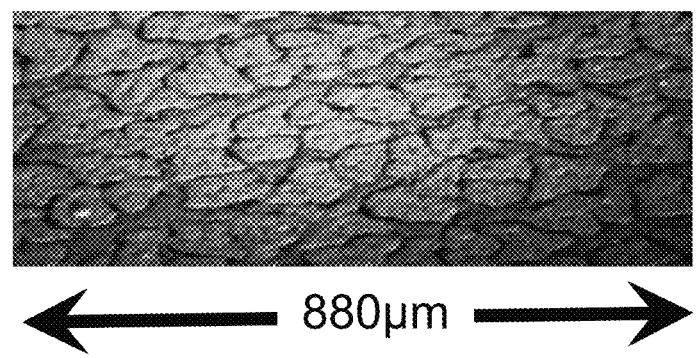
FIG. 6B is a diagram showing one embodiment of abrasive composite structures formed with a higher binder content.

Continuing with FIGS. 6A and 6B, the effect of different binder content is shown (along with a scale for comparative purposes). As is known, the binder is an epoxy (or equivalent) that, when set, secures the primary particle to the substrate. Again, what is not known is precisely how the binder content affects the cracking of the slurry during the drying process. As shown in FIGS. 6A and 6B, an increase in binder content correspondingly increases the size of the abrasive composite structures and decreases the spacing between the abrasive composite structures. In other words, although the sizes of the abrasive composite structures are directly proportional to the binder content (i.e., an increase in binder content increases the size), the spacing between the structures is inversely proportional to the binder content (i.e., an increase in binder content decreases the spacing). Preferably, the binder content ranges from ~5% to ~30% by volume. The specific parameters for FIGS. 6A and 6B are shown in TABLE 2 (with the same units as TABLE 1).

TABLE 2

BINDER

|  | FIG. 6A | FIG. 6B |
|---|---|---|
| Primary particle Content | 2.14% | 1.91% |
| Solids Content | 7.15% | 10.06% |
| Isopropyl Alcohol:Water | 1.718:1 | 1.394:1 |
| Viscosity | 50 | 45 cP |
| Wet coating Thickness | Bar 30, 45 cc/m$^2$ | Bar 30, 45 cc/m$^2$ |
| Drying Temperature | 121° C. | 121° C. |
| Drying Air Flow | 0.7 m/s | 0.7 m/s |

Again, what can be observed from FIGS. 6A and 6B is that the sizes of the abrasive composite structures have relatively larger variabilities as compared to embossed or molded structures, which have much smaller variability.

FIGS. 7A, 7B, 7C, and 7D show the effect of carrier solvent content (which is inversely related to the solids content) on the abrasive composite structures (again with a scale for comparative purposes). Preferably, the carrier solvent is at least a binary carrier solvent (meaning, at least two (2) separate solvents, such as water and isopropyl alcohol (IPA)). Specifically, the parameters that resulted in the abrasive composite structures of FIGS. 7A through 7D are shown in TABLE 3 (same units as shown in TABLES 1 and 2).

TABLE 3

CARRIER

Figure 7A:
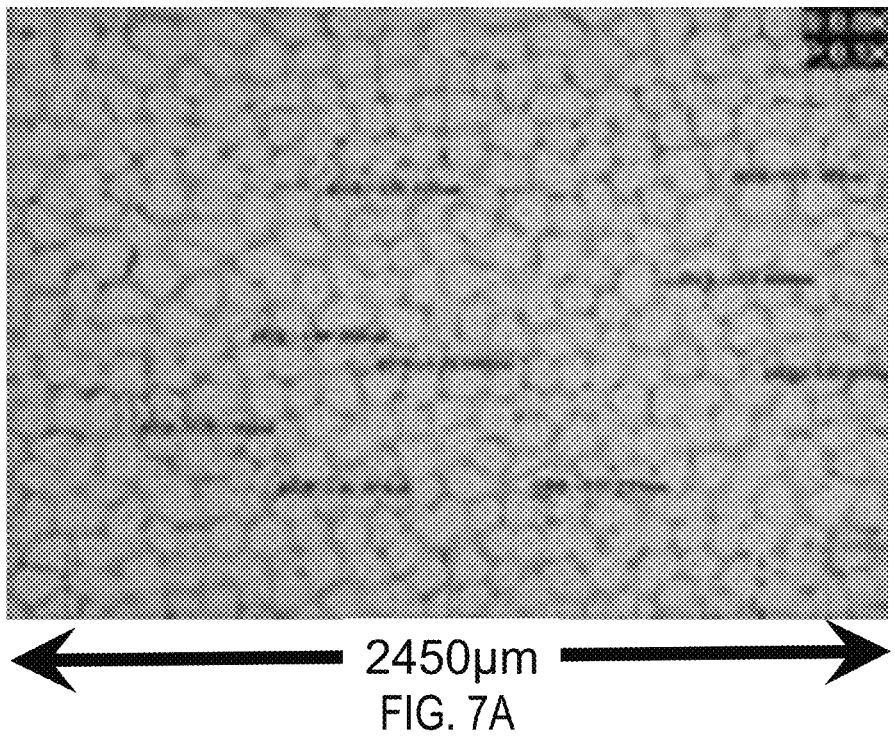
FIG. 7A is a diagram showing one embodiment of abrasive composite structures formed with a relatively low carrier solvent content.
Figure 7B:
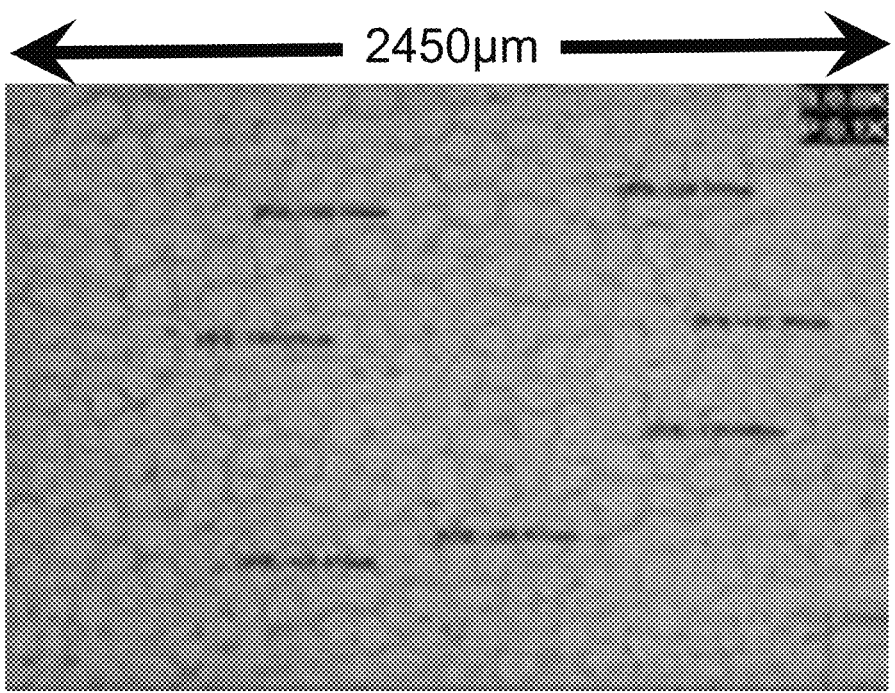
FIG. 7B is a diagram showing one embodiment of abrasive composite structures formed with higher carrier solvent content than the structures of FIG. 7A.
Figure 7C:
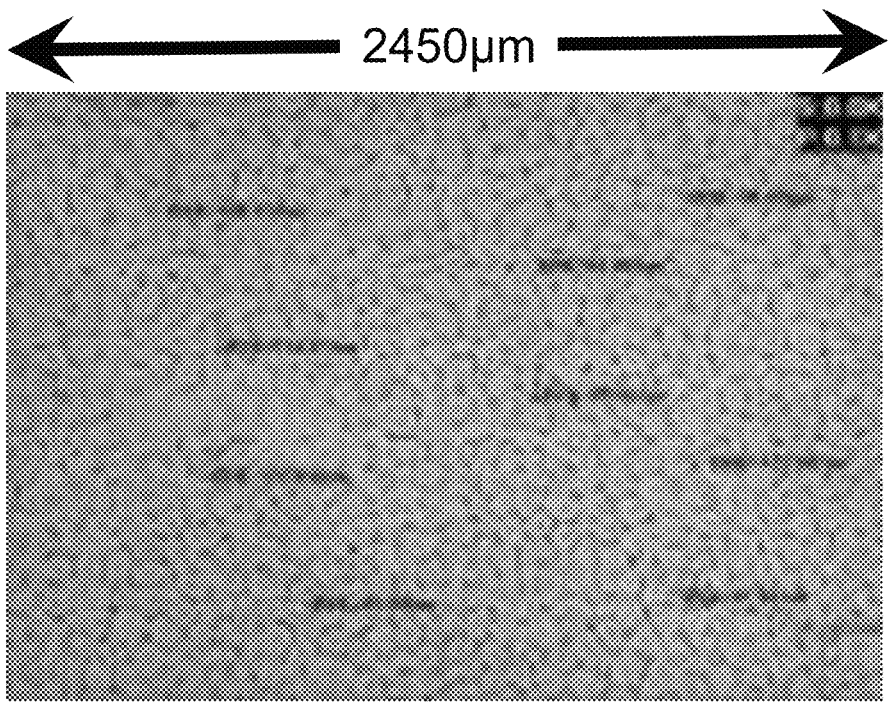
FIG. 7C is a diagram showing one embodiment of abrasive composite structures formed with higher carrier solvent content than the structures of FIG. 7B.
Figure 7D:
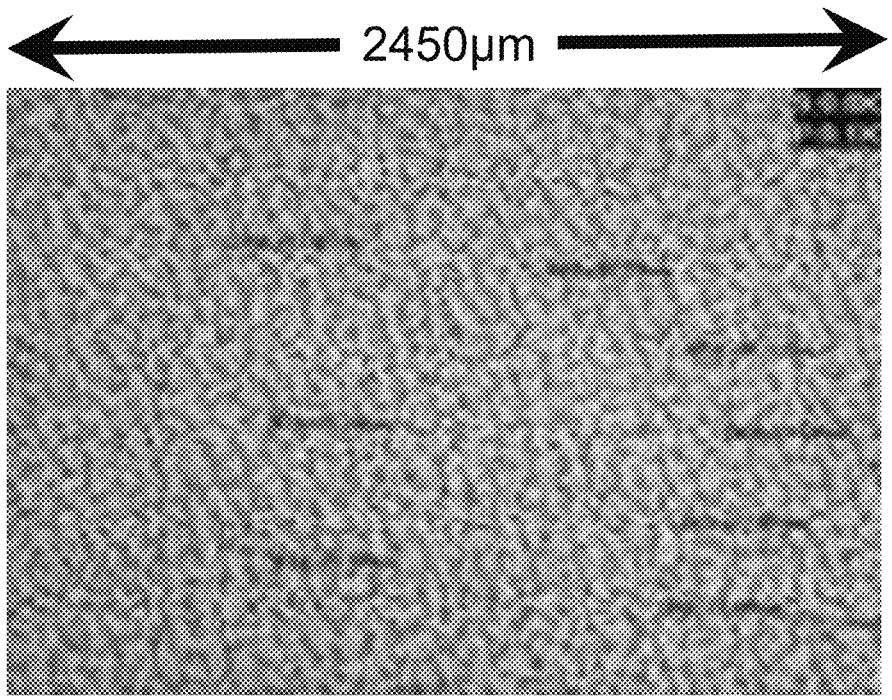
FIG. 7D is a diagram showing one embodiment of abrasive composite structures formed with higher carrier solvent content than the structures of FIG. 7C.
Figure 8A:
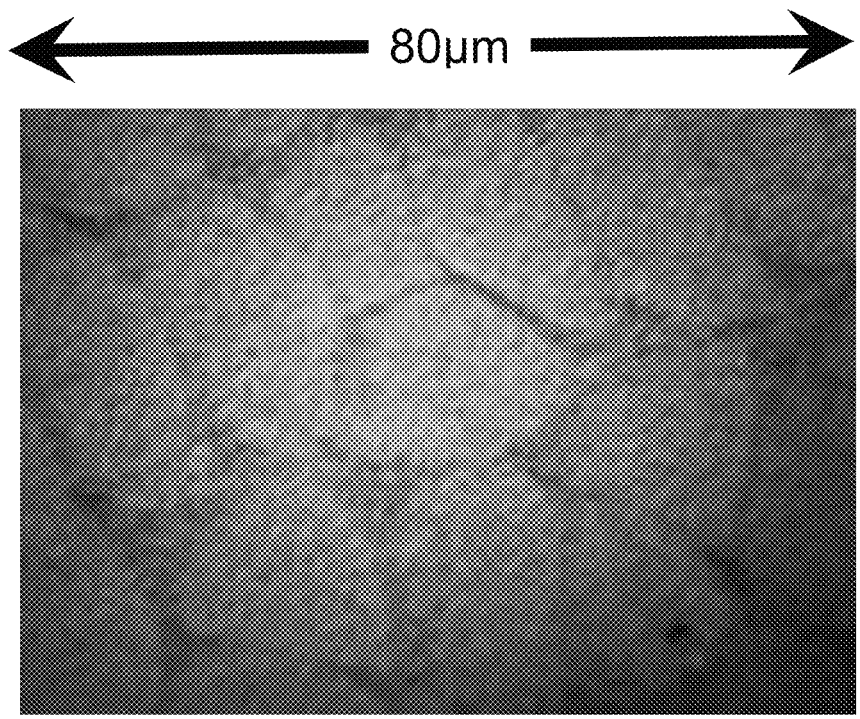
FIG. 8A is a diagram showing one embodiment of abrasive composite structures formed with a lower solvent ratio.
Figure 8B:
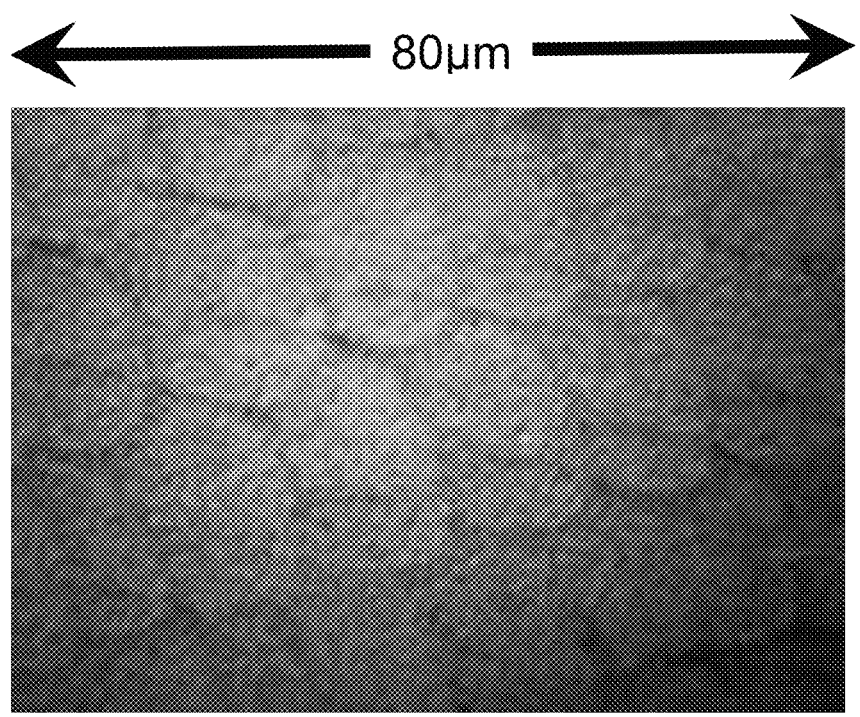
FIG. 8B is a diagram showing one embodiment of abrasive composite structures formed with a higher solvent ratio than the structures of FIG. 8A.
Figure 8C:
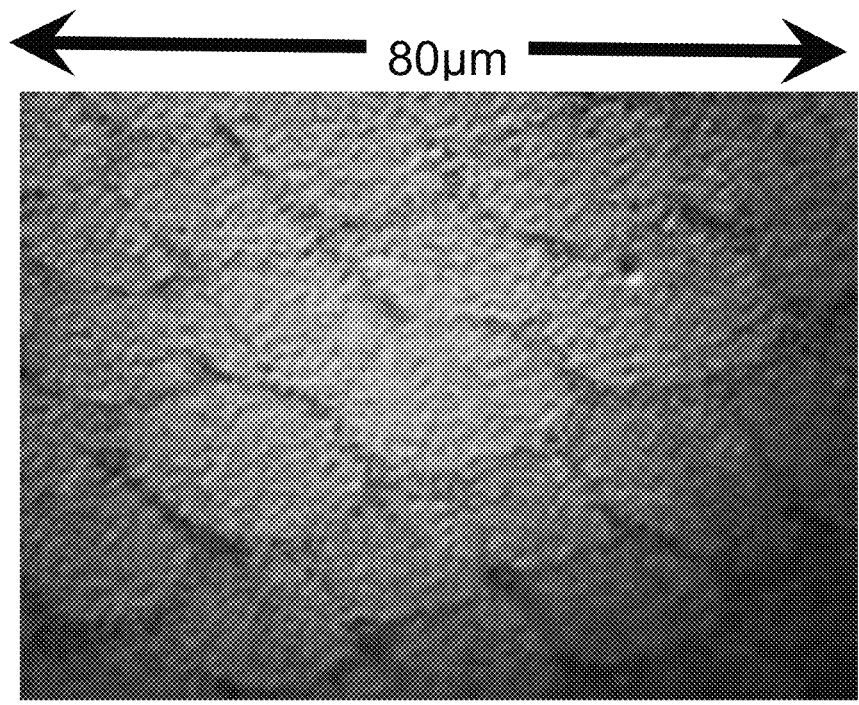
FIG. 8C is a diagram showing one embodiment of abrasive composite structures formed with a higher solvent ratio than the structures of FIG. 8B.
Figure 8D:
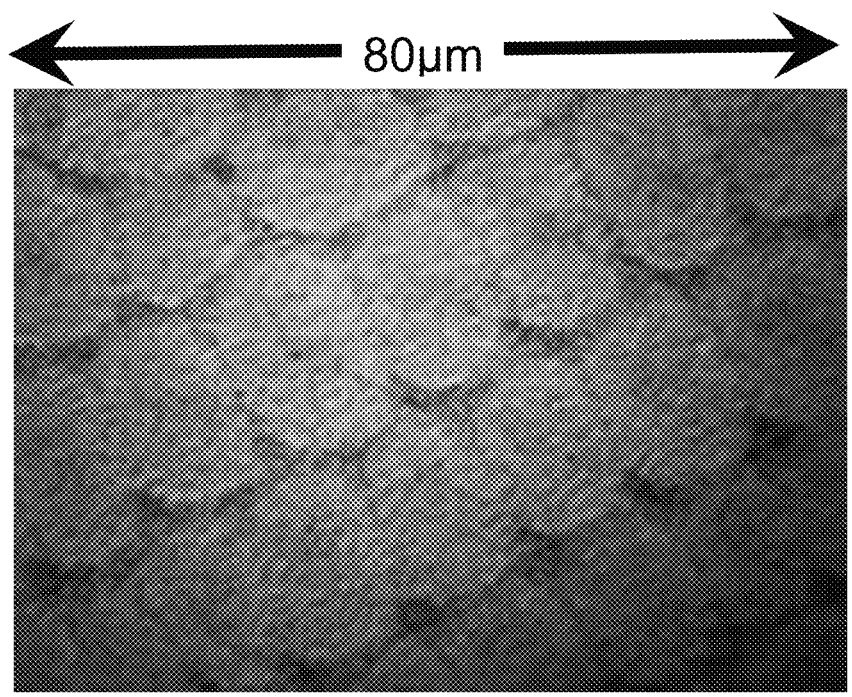
FIG. 8D is a diagram showing one embodiment of abrasive composite structures formed with a higher solvent ratio than the structures of FIG. 8C.

|  | FIG. 7A | FIG. 7B | FIG. 7C | FIG. 7D |
|---|---|---|---|---|
| Primary particle Content | 4.3% | 4.3% | 4.3% | 4.3% |
| Solids (Carrier) | 9% (91%) | 7% (93%) | 5% (95%) | 3% (97%) |
| Isopropyl Alcohol:Water | 1.361:1 | 1.361:1 | 1.361:1 | 1.361:1 |
| Viscosity | 27.5 cP | 27.5 cP | 27.5 cP | 27.5 cP |
| Wet coating Thickness | 45 cc/m$^2$ | 45 cc/m$^2$ | 45 cc/m$^2$ | 45 cc/m$^2$ |
| Drying Temperature | 121° C. | 121° C. | 121° C. | 121° C. |
| Drying Air Flow | 0.7 m/s | 0.7 m/s | 0.7 m/s | 0.7 m/s |

As shown in FIGS. 7A through 7D, an increase in solids content (or, alternatively, a decrease in carrier solvent content) increases correspondingly the degree of definition of the abrasive composite structures (or how well-defined is the abrasive composite structures). The carrier solvent content is also directly proportional to the spacing between the abrasive composite structures, meaning that an increase in carrier solvent content (which corresponds to a decrease in solids content) increases the spacing between the abrasive composite structures. In some embodiments, the carrier solvent content is between ~50% and ~95% by volume (with a corresponding solids volume being between ~5% and ~50%). Once again, the abrasive composite structures of FIGS. 7A and 7B exhibit larger variabilities as compared to conventional embossed or molded structures, which have much smaller variability.

FIGS. 8A, 8B, 8C, and 8D show the effect of solvent ratio on the abrasive composite structures (again with a scale for comparative purposes). As noted above, the carrier is at least a binary carrier (e.g., water and IPA) and, therefore, it is also possible to change the ratio of the solvents in the carrier. The parameters relating to FIGS. 8A though 8D are shown in TABLE 4.

TABLE 4

| SOLV. RATIO | | | | |
|---|---|---|---|---|
| | FIG. 8A | FIG. 8B | FIG. 8C | FIG. 8D |
| Primary particle Content | 0.81% | 0.77% | 0.74% | 0.71% |
| Solids | 4.74% | 4.50% | 4.22% | 3.97% |
| Isopropyl Alcohol:Water | 1.409:1 | 1.597:1 | 1.742:1 | 1.892:1 |
| Viscosity | 32.5 cP | 32.5 cP | 30 cP | 25 cP |
| Wet coating Thickness | 125 cc/m$^2$ | 125 cc/m$^2$ | 125 cc/m$^2$ | 125 cc/m$^2$ |
| Drying Temperature | 121° C. | 121° C. | 121° C. | 121° C. |
| Drying Air Flow | 0.7 m/s | 0.7 m/s | 0.7 m/s | 0.7 m/s |

As shown in FIGS. 8A through 8D, an increase in solvent ratio is directly proportional to the degree of definition, meaning, a higher solvent ratio produces abrasive composite structures with more definition. This is likely because an increase in solvent results in alignment of particles. A solvent ratio of between ~0.3 and ~5.0 is preferable. Similar to the larger variabilities shown in FIGS. 6A through 7B, the abrasive composite structures of FIGS. 8A and 8D exhibit larger variabilities because the natural drying and cracking process, which (unlike embossing or molding processes used in certain conventional abrasive manufacture) cannot be controlled with mathematical precision. It should be appreciated by those having skill in the art that a ternary solvent (or more) and the respective proportions of the solvent contents would further affect the drying and cracking process.

Figure 9A:
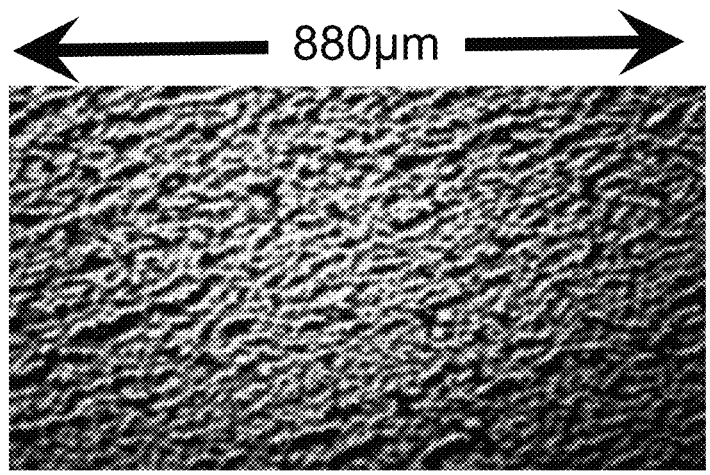
FIG. 9A is a diagram showing one embodiment of abrasive composite structures formed with a lower wet coating thickness.
Figure 9B:
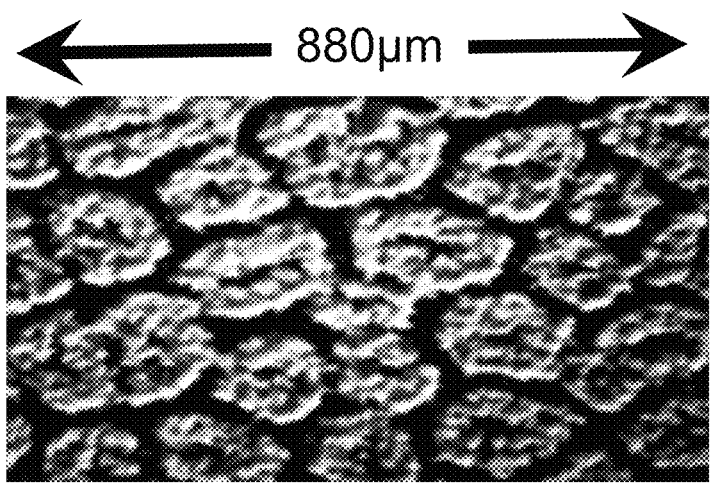
FIG. 9B is a diagram showing one embodiment of abrasive composite structures formed with a higher wet coating thickness than the structures of FIG. 9A.
Figure 9C:
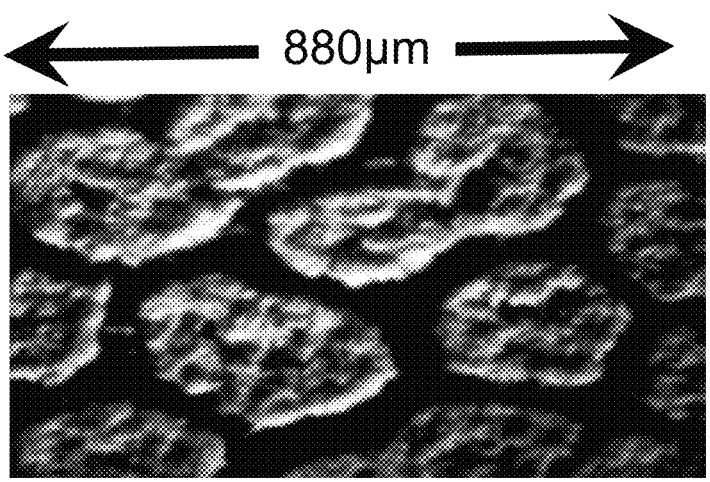
FIG. 9C is a diagram showing one embodiment of abrasive composite structures formed with a higher wet coating thickness than the structures of FIG. 9B.

FIGS. 9A, 9B, and 9C show abrasive composite structures at different wet coating thicknesses (again with a scale for comparative purposes). The parameters for FIGS. 9A through 9C are shown in TABLE 5.

TABLE 5

| WET THICK. | | | |
|---|---|---|---|
| | FIG. 9A | FIG. 9B | FIG. 9C |
| Primary particle Content | 1.54% | 1.54% | 1.54% |
| Solids | 9.34% | 9.34% | 9.34% |
| Isopropyl Alcohol:Water | 1.620:1 | 1.620:1 | 1.620:1 |
| Viscosity | 95 cP | 95 cP | 95 cP |
| Wet coating Thickness | 45 cc/m$^2$ (Bar 30) | 125 cc/m$^2$ (Bar 30) | 250 cc/m$^2$ (Box Knife 10 mil) |
| Drying Temperature | 121° C. | 121° C. | 121° C. |
| Drying Air Flow | 0.7 m/s | 0.7 m/s | 0.7 m/s |

As shown in FIGS. 9A through 9D, an increase in wet coating thickness produces larger abrasive composite structures and greater spacing between these structures. In other words, the wet coating thickness is directly proportional to the sizes of the abrasive composite structures and, also, directly proportional to the spacing between the abrasive composite structures. Preferably, the wet coating thickness ranges from ~5 cc/m$^2$ (cubic centimeters per meter squared) to ~500 cc/m$^2$. The abrasive composite structures of FIGS. 9A and 9D once again exhibit larger variabilities because of the difficulty in controlling with mathematical precision the drying and cracking process.

The effects of viscosity are shown in TABLE 6 (with the corresponding parameters). As shown in TABLE 6, an increase in viscosity is directly proportional to the degree of definition of the abrasive composite structures and, also, directly proportional to the regularity of the shapes of the abrasive composite structures. In other words, an increase in viscosity results in better structural definition and a more regular shape of the abrasive composite structures. Preferably, the viscosity ranges from approximately one centipoise (~1 cP) to ~2.000 cP.

TABLE 6

| VISCOSITY | | | | |
|---|---|---|---|---|
| | FIG. 10A | FIG. 10B | FIG. 10C | FIG. 10D |
| Primary particle Content | 4.3% | 4.3% | 4.3% | 4.3% |
| Solids | 3% | 3% | 3% | 3% |
| Isopropyl Alcohol:Water | 1.361:1 | 1.361:1 | 1.361:1 | 1.361:1 |
| Viscosity | 5 cP | 28 cP | 45 cP | 103 cP |
| Wet coating Thickness | 45 cc/m$^2$ | 45 cc/m$^2$ | 45 cc/m$^2$ | 45 cc/m$^2$ |
| Drying Temperature | 121° C. | 121° C. | 121° C. | 121° C. |
| Drying Air Flow | 0.7 m/s | 0.7 m/s | 0.7 m/s | 0.7 m/s |

It is worthwhile to note that the articles of manufacture (namely, the abrasives) shown in FIGS. 1 through 9D comprise a substrate (with a top side and a bottom side) and abrasive composite structures that are formed on the top side of the substrate. Of particular significance is that, although each abrasive composite structure has its own measurable diameter (expressly defined as the largest or longest measurable end-to-end distance of the non-circular structure), the aggregate of all of the measurable diameters has an average and a standard deviation. Because the drying and cracking process cannot be predicted with mathematical precision, there is a greater variability in the measurable diameters of the abrasive composite structures than the standard deviation of embossed abrasive composite structures. This variability manifests itself as a standard deviation that is greater than ten percent (>10%) of the average diameter. For other embodiments, the standard deviation is greater >20%, >30%, >50%, or even >80% of the average diameter. As one having skill in the art will appreciate, the average diameter can be computed through known computerized imaging and counting processes, which are not discussed further herein.

Having shown how alterations in binder content, carrier solvent content, solvent ratio, viscosity, and wet coating thickness produce different abrasive composite structures, attention is turned to FIGS. 10 through 14, which show flowcharts of several embodiments of processes for forming abrasive composite structures on a substrate.

Figure 10:
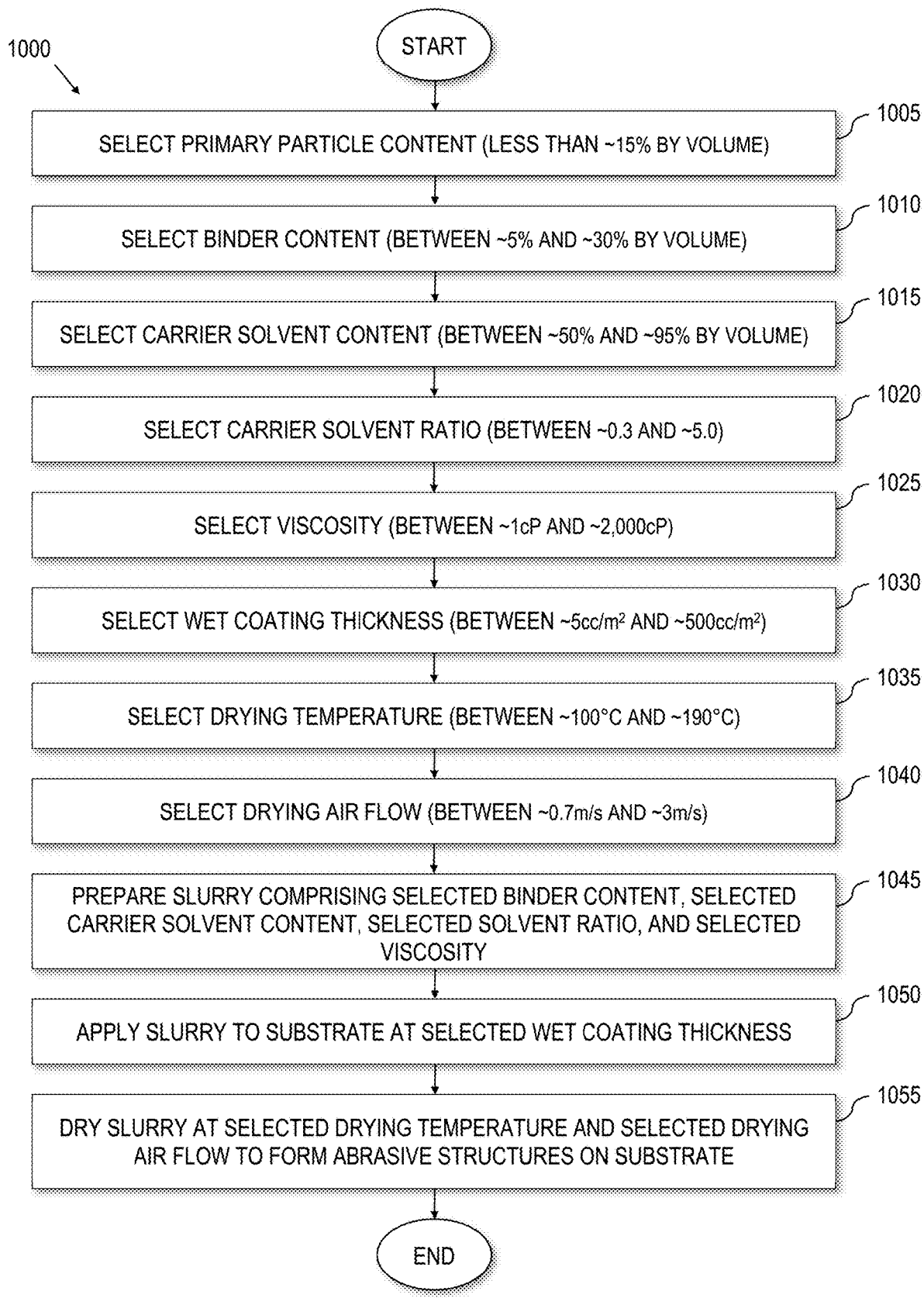
FIG. 10 is a flowchart showing one embodiment of a process for forming abrasive composite structures on a substrate.

FIG. 10 is a flowchart showing one embodiment of a process 1000 for forming abrasive composite structures on a substrate. As shown in FIG. 10, the process 1000 selects 1005 a primary particle content. As explained above, a preferred range for the primary particle content is less than ~15% by volume. The process 1000 also selects 1010 a binder content. Preferably, the binder content is between ~5% and ~30% by volume. The process 1000 further selects 1015 a carrier solvent content (which is effectively a selection of a solids content). The carrier solvent content, for some embodiments, ranges between ~50% and ~95% by volume. The process 1000 also selects 1020 a solvent ratio (for a binary solvent) and, also, selects 1025 a viscosity. The solvent ratio has a range of between ~0.3 and ~5.0. For example, if the binary solvent comprises isopropyl alcohol (IPA) and water, then a solvent ratio of 1.5 would mean that the IPA:water ratio is 1.5:1. The viscosity has a preferable range of between approximately one centipoise (~1 cP) and 2,000 cP. The process 1000 further selects 1030 a wet coating thickness, which is preferably in the range of ~5 cc/m$^2$ and ~500 cc/m$^2$. The process 1000 further selects 1035 a drying temperature and also selects 1040 a drying air flow. The drying temperature ranges between ~100° C. and ~190° C., while the drying air flow ranges between ~0.7 m/s (meters per second) and ~3 m/s.

Once all of these parameters have been selected, the process 1000 continues to preparing 1045 a slurry comprising the selected primary particle content, binder content, carrier solvent content, solvent ratio, and viscosity. The prepared 1045 slurry is then applied 1050 to a substrate at the selected 1030 wet coating thickness. Thereafter, the applied 1050 slurry is dried 1055 at the selected 1035 drying temperature and the selected 1040 drying air flow rate.

The process 1000 controls different variables to produce desired abrasive composite structures with a desired structure size, a desired structure spacing, a desired structure definition, a desired structure regularity, and a desired structure shape. The resulting abrasive composite structures have aspect ratios that range from ~0.5 to ~2. The widths (meaning, shortest measurable transverse dimensions) and lengths (meaning, longest measurable transverse dimensions) of the abrasive composite structures range from approximately ten times (~10×) to ~5,000× the size of a primary particle. The heights (meaning, average longitudinal distance (normal to the transverse plane)) of the abrasive composite structures range from ~1× to ~50× the primary particle size. The spacing (meaning, average transverse distance) between the abrasive composite structures range from ~10× to ~50× the primary particle size. The shapes are selectable to be U-shaped crescents of different convexity, circular structures, and polygonal structures (e.g., pentagons, hexagons, octagons, and so on). Furthermore, the structures are manufacturable either with a dimple (or void or cavity) or without a dimple (or void or cavity).

As one can appreciate, the ability to control the features of abrasive composite structures through judicious selection of the slurry property provides efficiencies that are not achievable through conventional approaches to manufacturing slurry-coated abrasive. Furthermore, unlike the principles of operation for conventional slurry-coated systems, the principles that govern drying and cracking of slurry is remarkably different than the selection of primary particle size associated with conventional slurry-coated abrasive manufacturing processes.

Figure 11:
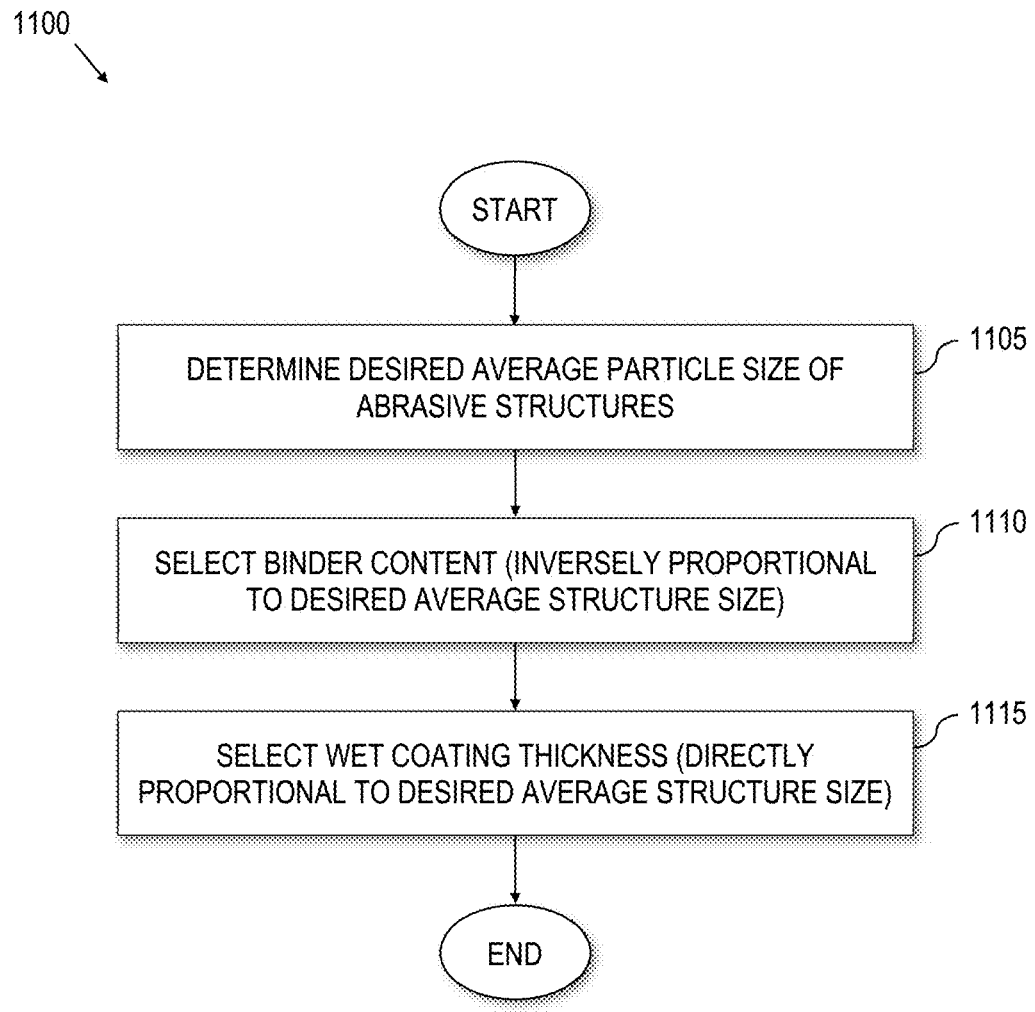
FIG. 11 is a flowchart showing one embodiment of additional steps in a process for forming abrasive composite structures on a substrate.

Continuing, FIG. 11 is a flowchart showing an embodiment of a process 1100 for forming abrasive composite structures on a substrate. Specifically, FIG. 11 describes a process 1100 as it relates to average sizes of abrasive composite structures (e.g., average diameter of the abrasive composite structures). Thus, the process 1100 comprises determining 1105 a desired average size (e.g., average diameter) for the abrasive composite structure. Upon determining 1105 the desired average size, the process 1100 selects 1110 the binder content, which preferably is inversely proportional to the desired average size of the abrasive composite structure. The process 1110 further selects 1115 the wet coating thickness, which preferably is directly proportional to the desired average size of the abrasive composite structure. Throughout this disclosure, it should be appreciated that the phrase "directly proportional" means that an increase in one parameter results in an increase (whether linearly or nonlinearly) in another parameter. Also, the phrase "inversely proportional" shall mean that an increase in one parameter results in a decrease (whether linearly or nonlinearly) in another parameter.

Figure 12:
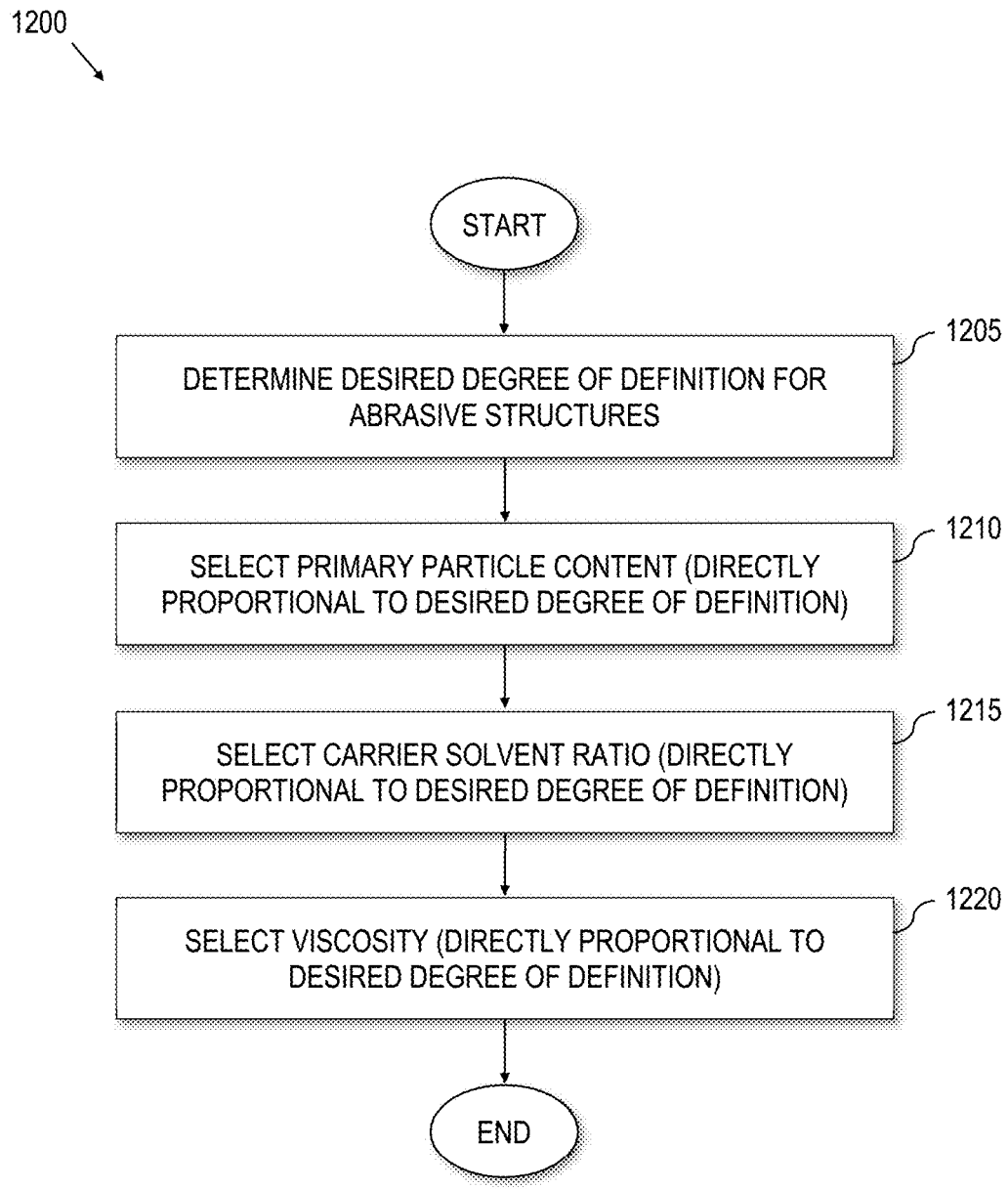
FIG. 12 is a flowchart showing another embodiment of additional steps in a process for forming abrasive composite structures on a substrate.

Continuing, FIG. 12 is a flowchart showing another embodiment of a process 1200 for forming abrasive composite structures on a substrate. Specifically, FIG. 12 describes a process 1200 as it relates to the degree of definition of the abrasive composite structures (or how well-defined are the abrasive composite structures). As shown in FIG. 12, the process 1200 determines 1205 a desired degree of definition (or how well-defined the abrasive composite structures should be). Based on the desired degree of definition, the process 1200 selects 1210 the primary particle content, which preferably is directly proportional to how well-defined the abrasive composite structure should be. Furthermore, the process 1200 selects 1215 the solvent ratio, which again should be directly proportional to the desired degree of definition. The process 1200 also selects 1220 the viscosity of the slurry, which is also directly proportional to the desired degree of definition of the abrasive composite structure.

Figure 13:
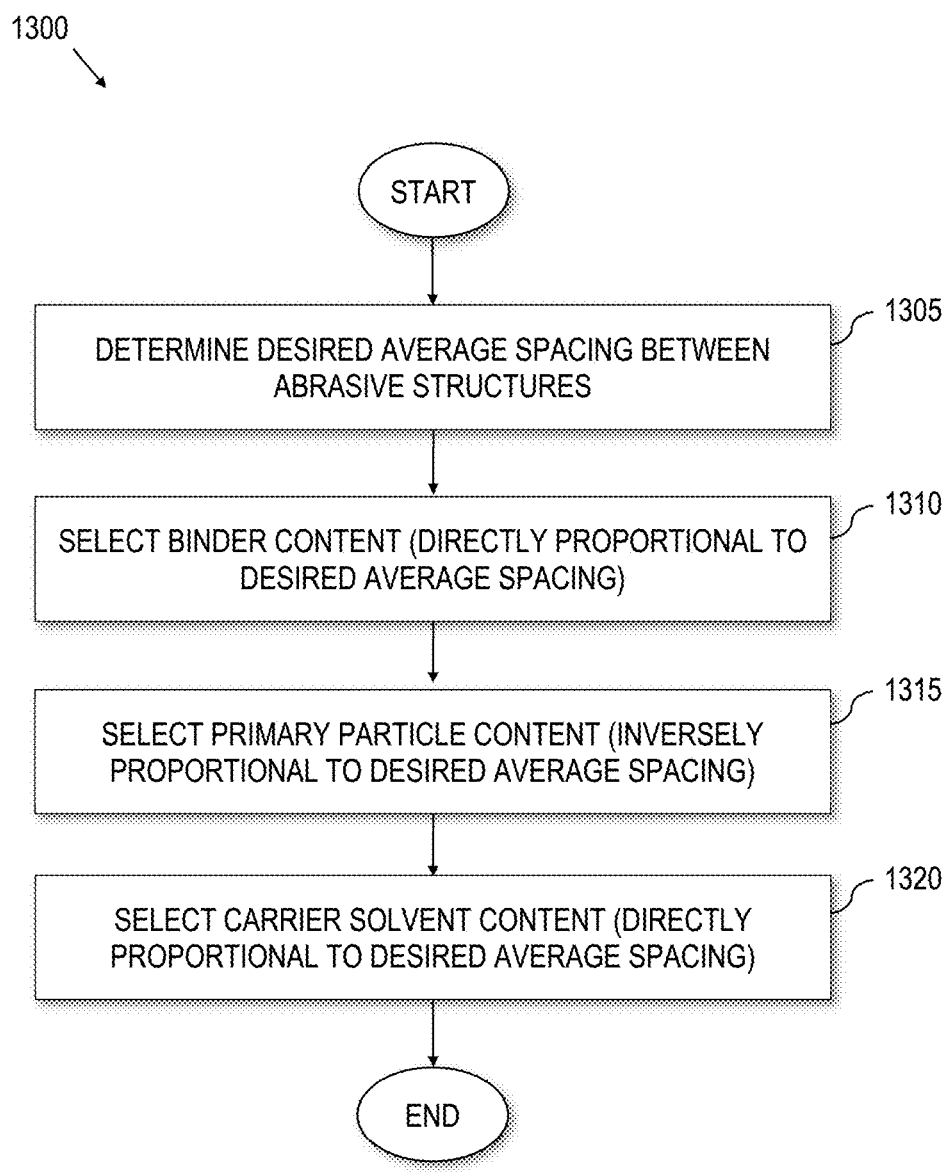
FIG. 13 is a flowchart showing yet another embodiment of additional steps in a process for forming abrasive composite structures on a substrate.

FIG. 13 is a flowchart showing a process 1300 that relates to how the spacing between the abrasive composite structures are controlled. As shown in FIG. 13, the process 1300 determines 1305 the desired average spacing between the abrasive composite structures. The process 1300 selects 1310 the binder content in direct proportion to the desired average spacing. Again, direct proportion means that a higher binder content is selected 1310 if greater spacing is desired. The process 1300 then selects 1315 the primary particle content, but in inverse proportion to the desired spacing, meaning that a lower primary particle content is selected 1315 if greater spacing is desired between the abrasive composite structures. The process 1300 also selects 1320 the carrier solvent content in direct proportion to the desired average spacing.

Figure 14:
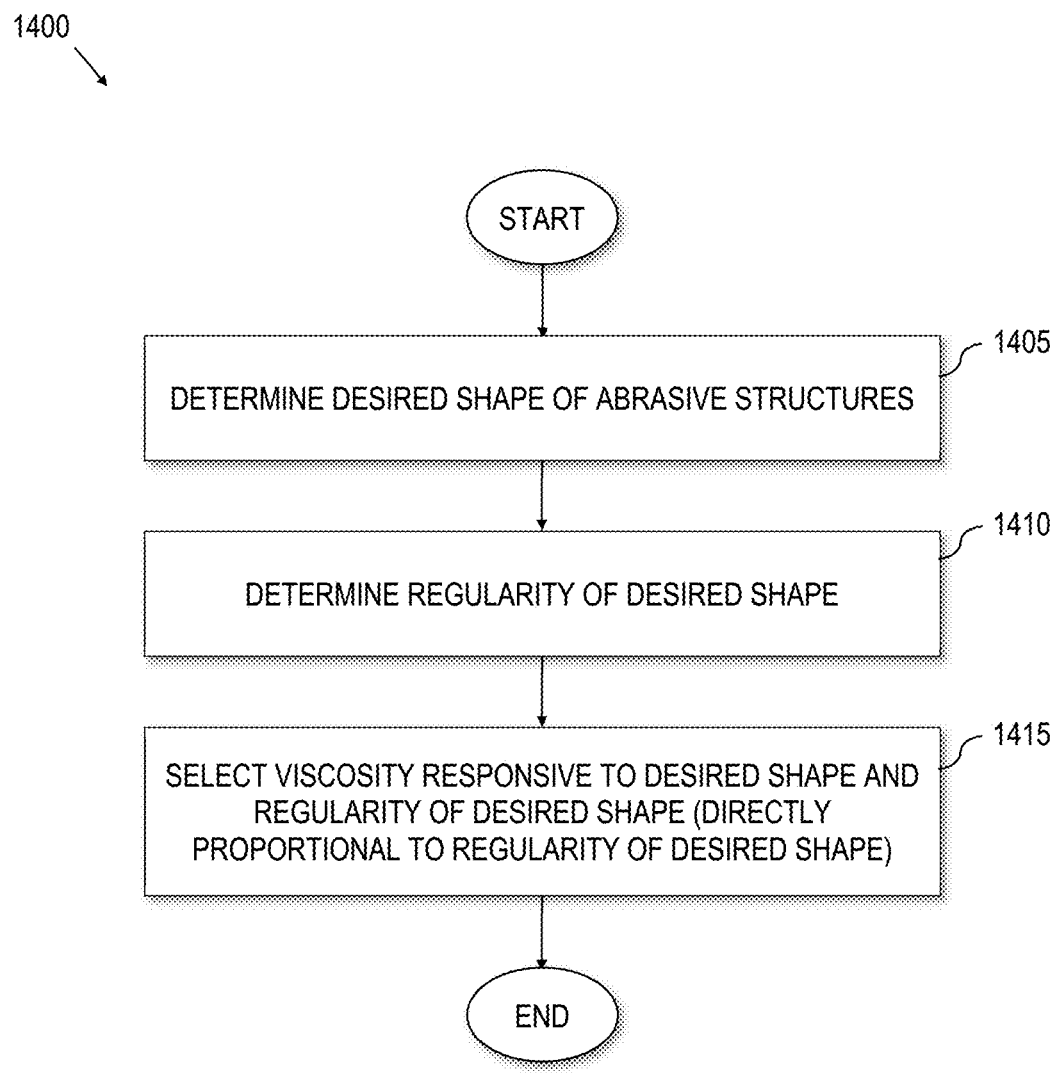
FIG. 14 is a flowchart showing yet another embodiment of additional steps in a process for forming abrasive composite structures on a substrate.

Turning now to FIG. 14, the process 1400 shown relates to the shape of the abrasive composite structures and regularity of the shape. As shown in FIG. 14, the process 1400 determines 1405 the desired shape of the abrasive composite structures. Thereafter, the process 1400 further determines 1410 the desired regularity of the shape. The process 1400 selects 1415 the viscosity in accordance with the desired shape, with the viscosity being directly proportional to the desired regularity of the shape of the abrasive composite structures.

As one can appreciate, by judicious control and selection of the process parameters, the sizes, shapes, and spacings of the abrasive composite structures are controllable.

Next, attention is turned to FIGS. 15 through 18, which compare conventional slurry-coated abrasives with various embodiments of the inventive abrasive composite structures.

Figure 15:
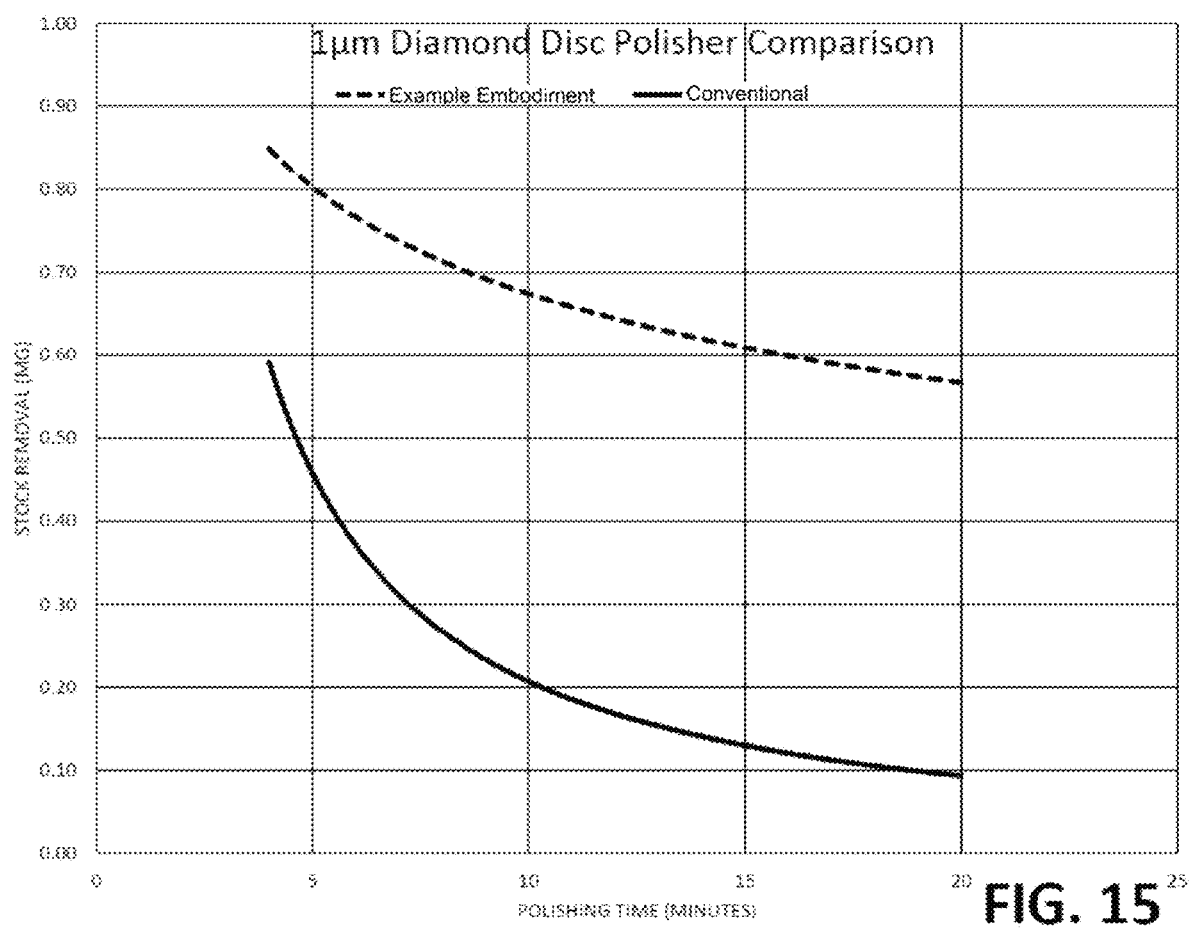
FIG. 15 is a graph showing a comparison of stock removal for a conventional slurry-coated abrasive and one embodiment of an inventive abrasive composite structures.

FIG. 15 is a graph showing a comparison of stock removal for an abrasive with conventional slurry-coated abrasive and one embodiment having inventive abrasive composite structures. Specifically, FIG. 15 shows a comparison of stock removal for a conventional one micrometer (1 μm) diamond slurry-coated abrasive disc (shown as a solid line) and one embodiment of a 1 μm diamond inventive abrasive (shown as a broken line). For clarity, this means that for both the slurry-coated abrasive and the embodiment of the inventive abrasive, the primary particle is diamond with a nominal size of 1 μm. As shown in FIG. 15, the conventional slurry-coated abrasive is comparatively less efficient than the inventive abrasive.

Figure 16:
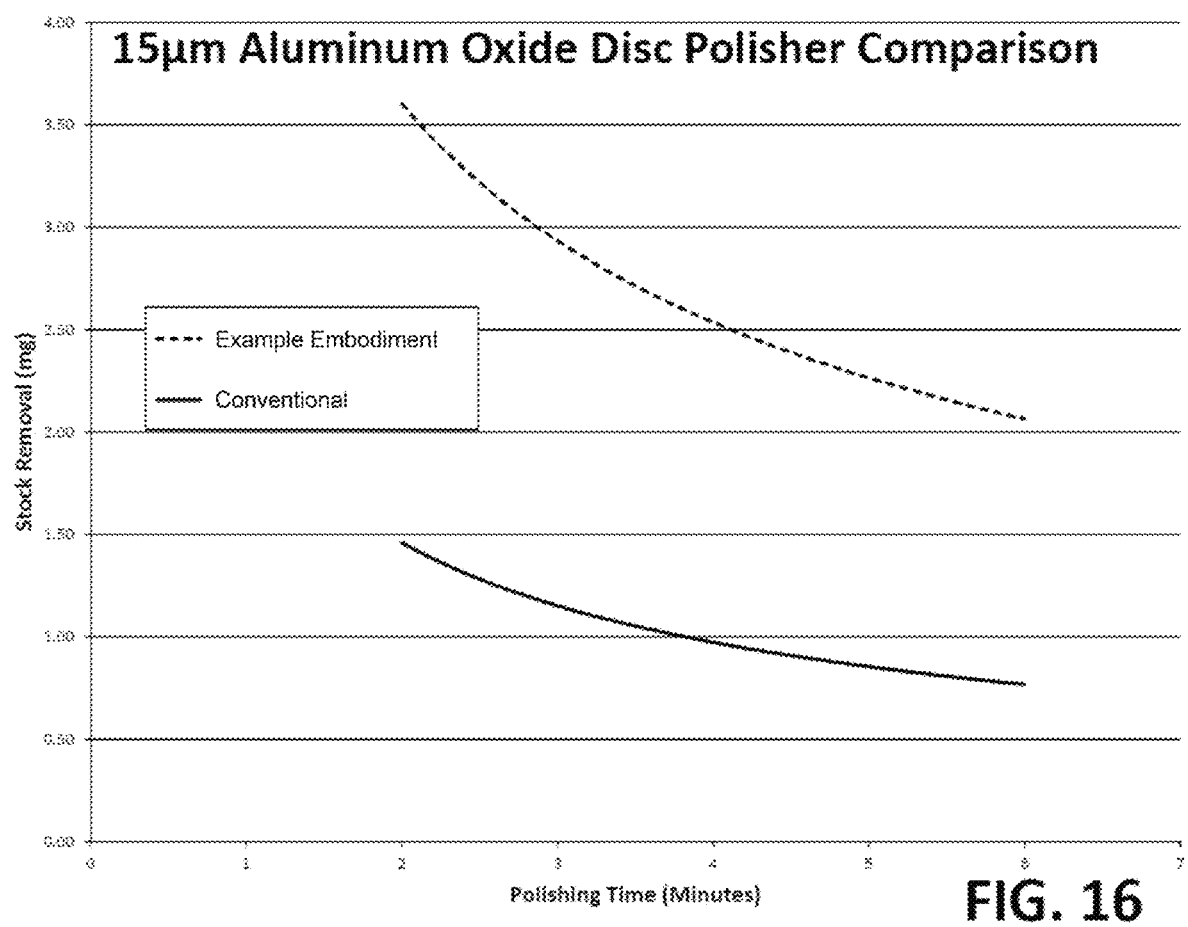
FIG. 16 is a graph showing a comparison of stock removal for another conventional slurry-coated abrasive and another embodiment of the inventive abrasive composite structures.

FIG. 16 is a graph showing a comparison of stock removal for another slurry-coated abrasive and another embodiment of the inventive abrasive composite structures. Specifically, FIG. 16 shows a comparison of stock removal for a conventional 15 μm aluminum oxide slurry-coated abrasive disc (shown as a solid line) and one embodiment of an inventive 15 μm aluminum oxide abrasive disc (shown as a broken line). As shown in FIG. 15, the conventional aluminum oxide abrasive (with aluminum oxide being the primary particle) is comparatively less efficient than the inventive aluminum oxide abrasive.

Figure 17:
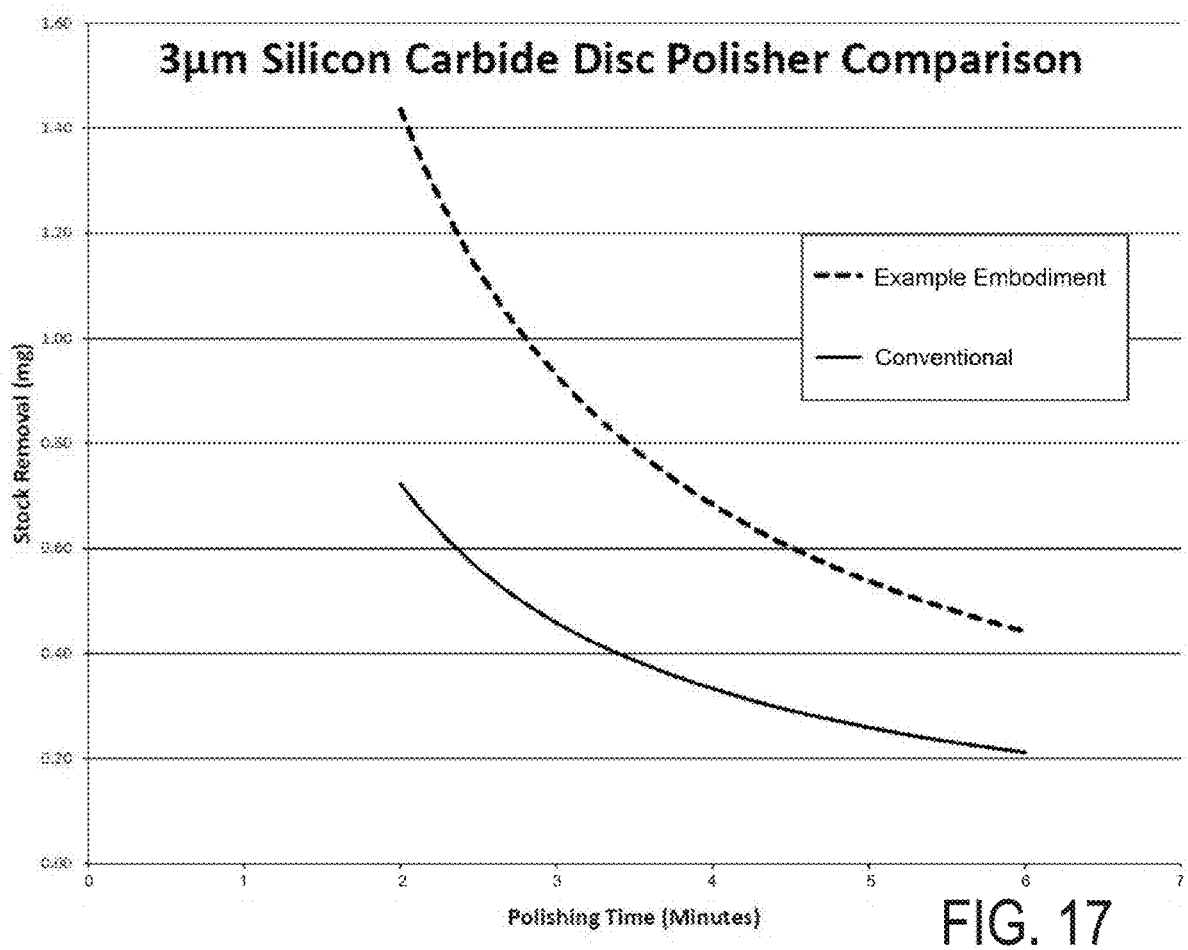
FIG. 17 is a graph showing a comparison of stock removal for yet another conventional slurry-coated abrasive and yet another embodiment of the inventive abrasive composite structures.

FIG. 17 is a graph showing a comparison of stock removal for yet another conventional slurry-coated abrasive and yet another embodiment of the inventive abrasive composite structures. Specifically, FIG. 17 shows a comparison of stock removal for a conventional 3 μm silicon carbide abrasive disc (shown as a solid line) and one embodiment of an inventive 3 μm silicon carbide abrasive disc (shown as a broken line). As shown in FIG. 15, the conventional silicon carbide abrasive (with primary particle being silicon carbide) is comparatively less efficient than the inventive silicon carbide abrasive.

The results shown in FIGS. 15 through 17 are surprising because one would not intuitively expect more-heterogeneous abrasive composite structures to outperform more-homogeneous slurry-coated abrasives, let alone to the extent shown in FIGS. 15 through 17.

Figure 18:
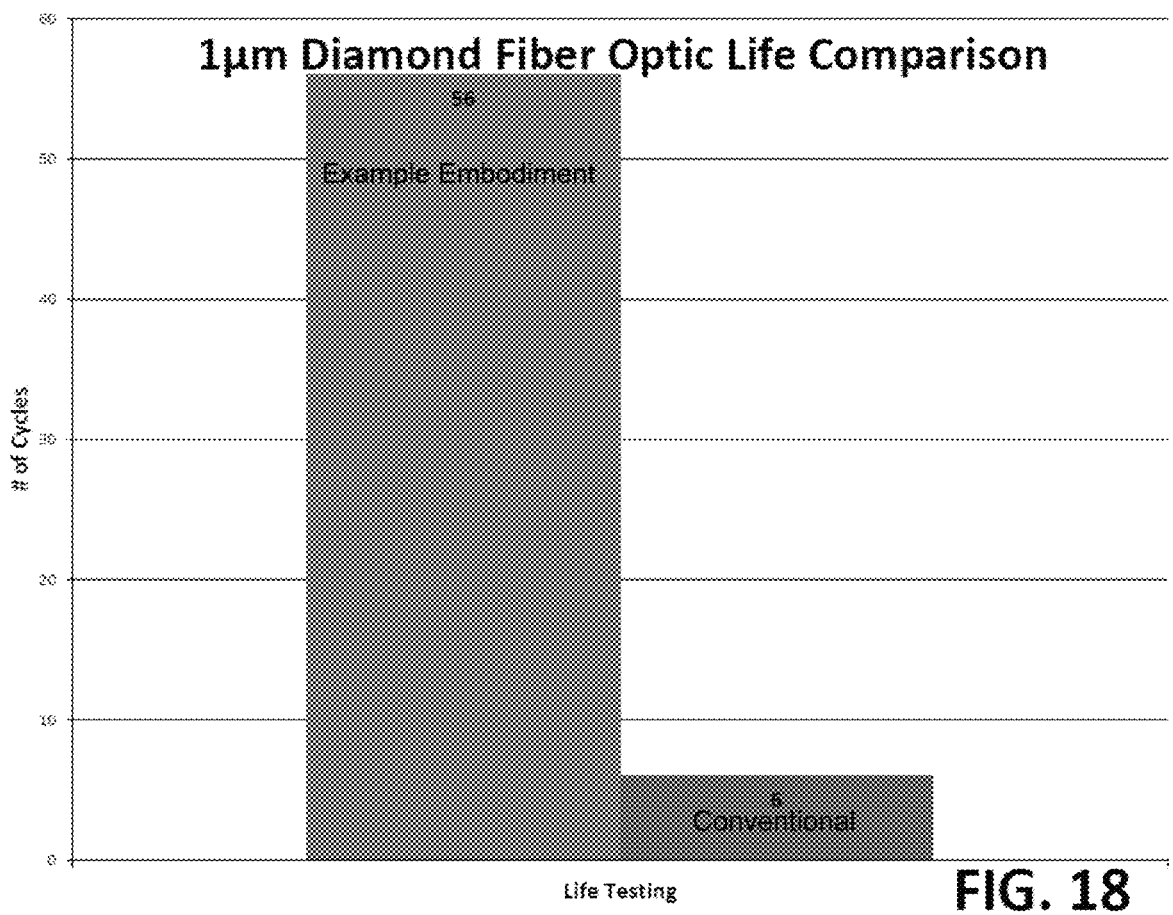
FIG. 18 is a chart showing a comparison of life testing for a conventional slurry-coated abrasive and one embodiment of the inventive abrasive composite structures.

FIG. 18 is a chart showing a comparison of life testing for a conventional slurry-coated abrasive and one embodiment of the inventive abrasive composite structures. Specifically, a 1 μm diamond slurry-coated abrasive is compared and, as shown in FIG. 18, the inventive diamond abrasive (with diamond being the primary particle) has a usable life that is nearly ten times (~10×) greater than the conventional slurry-coated diamond abrasive.

The data in FIG. 18 is both surprising and unexpected because the inventive abrasive appears to have a usable life that is nearly an order of magnitude greater than conventional slurry-coated abrasives.

As one can appreciate from the embodiments shown and described with reference to FIGS. 1 through 18, by controlling various parameters associated with the slurry, along with the wet coating thickness and the drying conditions, different shapes, sizes, and spacings for abrasive composite structures can be controlled. Consequently, more flexibility and greater cost savings can be realized over conventional slurry-coated abrasive approaches that control coarseness and fineness mainly through primary particle sizes or embossing techniques. Furthermore, the abrasives that are manufactured using the disclosed processes are unexpectedly better than the abrasives manufactured using conventional slurry-coated processes, insofar as the disclosed abrasives have a longer usable life and, also, provide better stock removal.

Any process descriptions or blocks in flow charts should be understood as representing modules, segments, or portions of code which include one or more executable instructions for implementing specific logical functions or steps in the process, and alternative implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A manufacturing process for forming abrasive composite structures on a substrate, the process comprising:
   preparing a slurry comprising:
      a primary particle content that is less than approximately fifteen percent (~15%) by volume;
      a binder content that is between ~5% and ~30% by volume;
      a carrier solvent content that is between ~50% and ~95% by volume, the carrier solvent being a binary solvent, the binary solvent comprising water and alcohol;
      a solvent ratio of alcohol to water that is between ~0.3 and ~5.0; and
      a viscosity that is between approximately one centipoise (~1 cP) and ~2,000 cP;
   applying the slurry to the substrate at a wet coating thickness that is between approximately five cubic centimeters per square meter (~5cc/m2) and ~500cc/m2; and
   drying the slurry at a drying temperature and a drying air flow to produce cracks, the cracks forming abrasive composite structures on the substrate, the drying temperature being between approximately one hundred degrees Celsius (~100° C.) and ~190° C., the drying air flow being between approximately 0.7 meters-per-second (~0.7 m/s) and ~3 m/s.

2. A manufacturing process for forming abrasive composite structures on a substrate, the process comprising:
   preparing a slurry comprising:
      a primary particle content that is less than approximately fifteen percent (~15%) by volume;
      a binder content that is between ~5% and ~30% by volume;
      a carrier solvent content that is between ~50% and ~95% by volume, the carrier solvent being a binary solvent, the binary solvent comprising water and alcohol;
      a solvent ratio of alcohol to water that is between ~0.3 and ~5.0; and
      a viscosity that is between approximately one centipoise (~1 cP) and ~2,000 cP;
   applying the slurry to the substrate at a wet coating thickness that is between approximately five cubic centimeters per square meter (~5cc/m2) and ~500cc/m2; and
   drying the slurry at a drying temperature and a drying air flow to form abrasive composite structures on the substrate without using a mold, the drying temperature being between approximately one hundred degrees Celsius (~100° C.) and ~190° C., the drying air flow being between approximately 0.7 meters-per-second (~0.7 m/s) and ~3 m/s.

3. A manufacturing process for forming abrasive composite structures on a substrate, the process comprising:
   preparing a slurry comprising:
      a primary particle content that is less than approximately fifteen percent (~15%) by volume;
      a binder content that is between ~5% and ~30% by volume;
      a carrier solvent content that is between ~50% and ~95% by volume, the carrier solvent being a binary solvent, the binary solvent comprising water and alcohol;
      a solvent ratio of alcohol to water that is between ~0.3 and ~5.0; and
      a viscosity that is between approximately one centipoise (~1 cP) and ~2,000 cP;
   applying the slurry to the substrate at a wet coating thickness that is between approximately five cubic centimeters per square meter (~5cc/m2) and ~500cc/m2; and
   drying the slurry at a drying temperature and a drying air flow to form heterogeneous abrasive composite structures on the substrate, the drying temperature being between approximately one hundred degrees Celsius (~100° C.) and ~190° C., the drying air flow being between approximately 0.7 meters-per-second (~0.7 m/s) and ~3 m/s.

* * * * *